April 22, 1958     T. F. BAYZE     2,831,967
AIR CRASH SIGNAL DEVICE
Filed Dec. 27, 1955     2 Sheets-Sheet 1
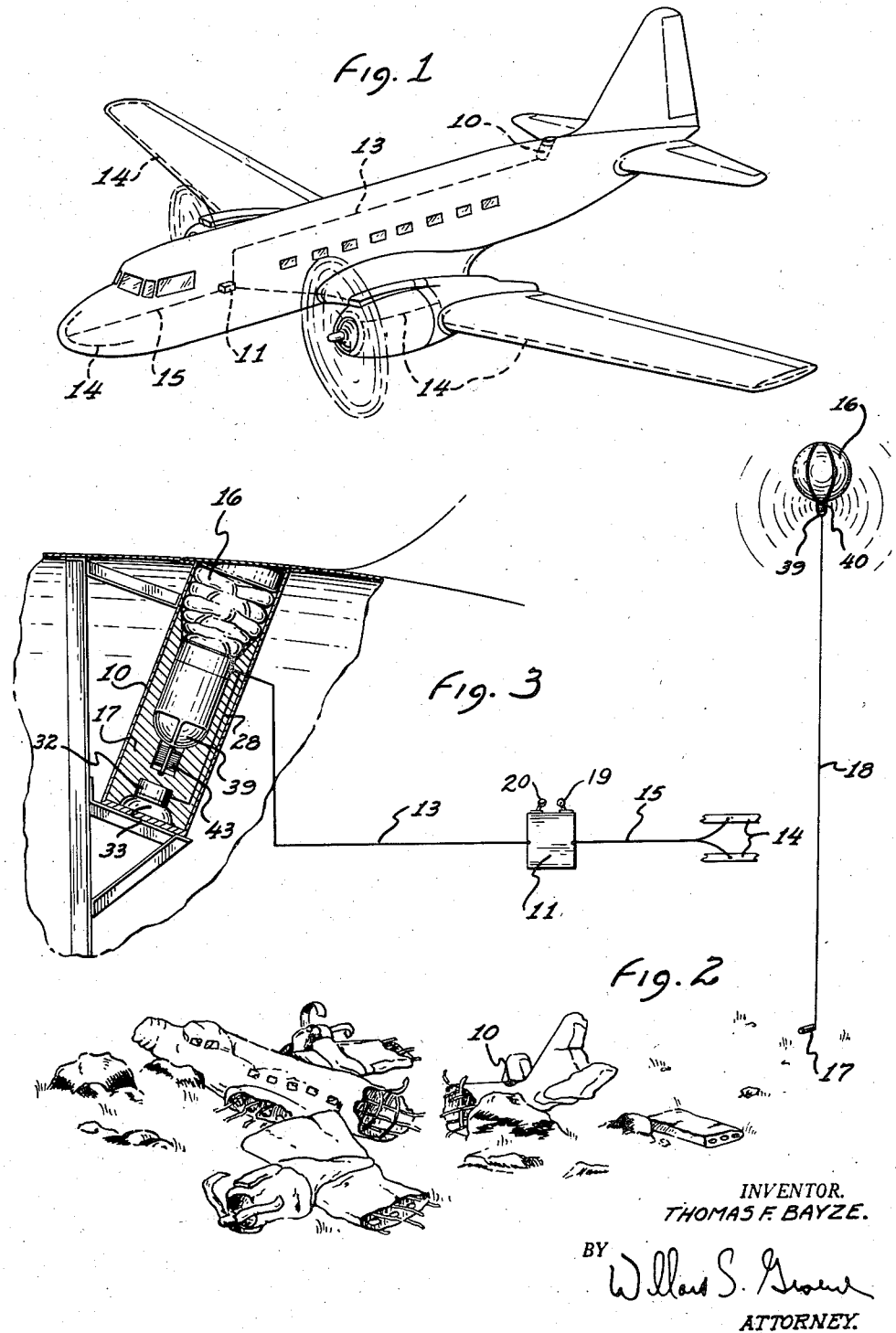
INVENTOR.
THOMAS F. BAYZE.
BY Willard S. Ground
ATTORNEY.

April 22, 1958     T. F. BAYZE     2,831,967
AIR CRASH SIGNAL DEVICE

Filed Dec. 27, 1955     2 Sheets-Sheet 2

INVENTOR.
THOMAS F. BAYZE.
BY
ATTORNEY.

United States Patent Office 2,831,967
Patented Apr. 22, 1958

2,831,967

AIR CRASH SIGNAL DEVICE

Thomas F. Bayze, San Diego, Calif.

Application December 27, 1955, Serial No. 555,530

3 Claims. (Cl. 250—17)

This invention pertains to improvements in air crash signal devices and is related to that of my co-pending patent application, Serial No. 510,609, filed May 24, 1955, now abandoned.

This invention pertains to improvements in air crash warning devices and is particularly directed to an improved apparatus for automatically providing a radio signal radiation from the sight of the air crash.

One of the objects of this invention is to provide an improved air crash signalling device which is automatically put in operation whenever disaster or mechanical damage of significant nature overtakes an air plane in flight.

Still another object of this invention is to provide an improved automatically functioning radio signalling device which may be discharged from a disabled aircraft during flight and which rises as a balloon with an anchor weight substantially at the sight of the crash or mishap so as to automatically provide a radio signal at the sight for easy finding and prompt rescue work.

Further features and advantages of this invention will appear from a detailed description of the drawings in which:

Fig. 1 is a general perspective view of an aircraft incorporating the features of this invention.

Fig. 2 is a view showing the situation immediately after crash of the aircraft.

Fig. 3 is a general sectional view showing the discharge apparatus of the aircraft signal device.

Figure 4:
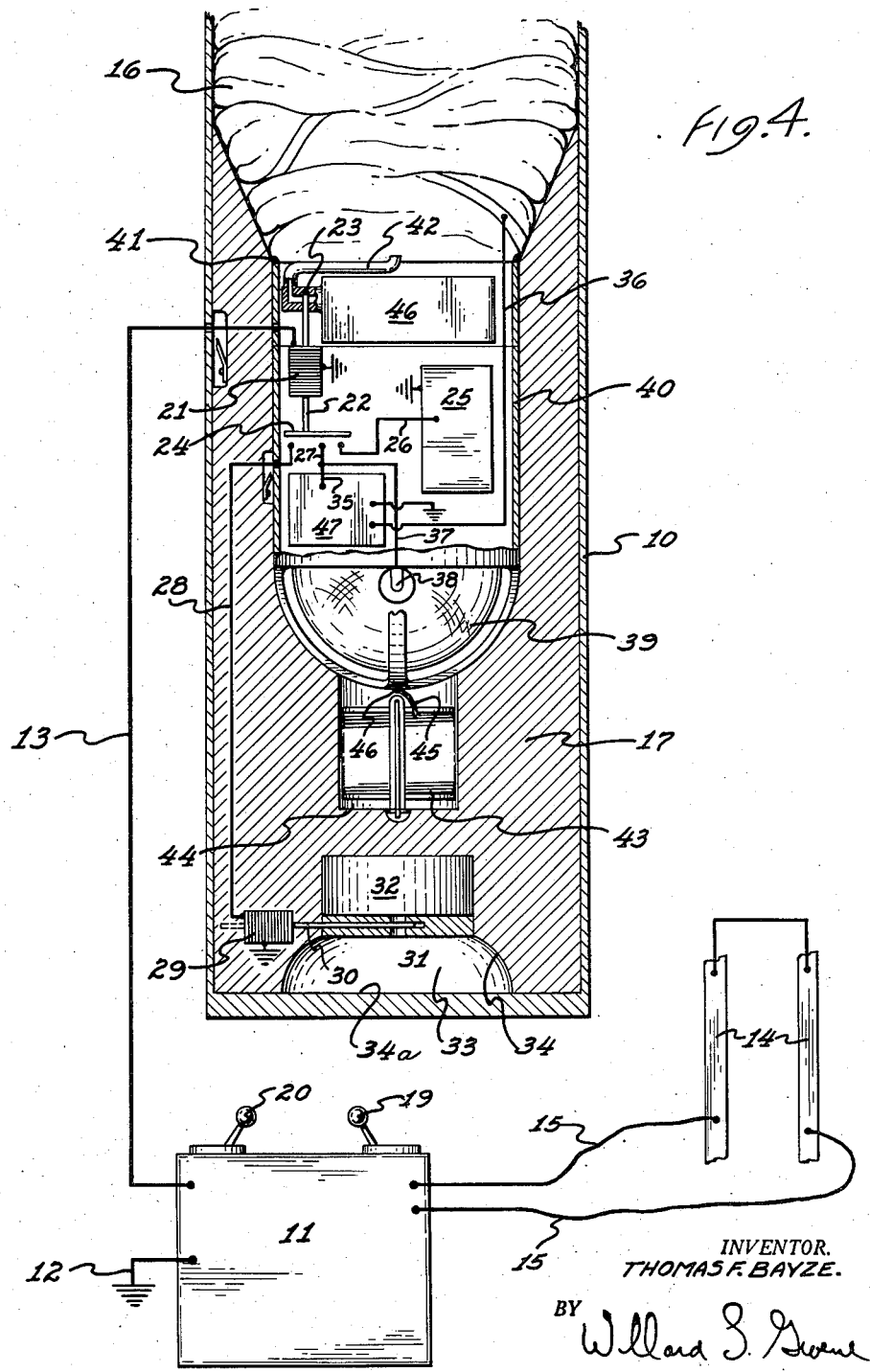
Fig. 4 is a detailed enlarged view showing the particular relationship of the various pieces of mechanism in the air crash signal device.

As an example of one embodiment of this invention there is shown an aircraft in Fig. 1 in which is provided the discharge tube 10 at the top and toward the rear of the tail section of the aeroplane. A suitable power supply unit 11 has one power supply lead 12 grounded to the plane structure and the hot lead 13 connected to energize the apparatus in the tube 10. Suitable crash tapes 14 are distributed throughout the aircraft at vulnerable points and are connected through leads 15 to the power unit 11 in such a manner that whenever any one or more points of the tapes 14 are severed the power unit functions to energize the apparatus in the tube 10.

In the event of a crash and the plane disintegrates as shown in Fig. 2 the crash tapes 14 will be separated causing the unit to be energized in a manner to be described throwing out a balloon 16 having a radio transmitter fixed to the under side thereof together with an anchor weight 17 and a payout cable 18.

The power unit 11 is provided with a control switch 19 for disconnecting the functioning of the crash tapes 14 as when the aircraft is being dissembled or worked upon on the ground. A control switch 20 is also provided for disconnecting the power pact from supplying power to the ejectable device when it is to be replaced or serviced. Normally, with the switches 19 and 20 in operative position power from the power pack 11 passes through the lead 13 to the relay coil 21 holding the armature 22 upwardly so as to maintain the helium control valve 23 closed and the contact bar 24 upwardly and disconnected from any contacts. When a crash takes place so as to sever one or more of the tapes 14 at any point, energy is suddenly disconnected from the lead 13 de-energizing the relay coil 21 causing the bar 24 to drop. This connects power from the power pack 25 which then energizes lead 26 which is connected by the contact bar 24 to the lead 27 and also to the lead 28 energizing lead 28 in turn energizes relay coil 29 causing the armature 30 to be moved so as to open the carbon-dioxide valve 31 to release compressed carbon-dioxide from the chamber 32 into the ejecting chamber 33 formed by the cavity 34 in the bottom of the anchor weight member 17. Pressure released in the chamber 33 reacting against the inside 34a of the discharge tube 10 ejects the anchor weight 17 and the balloon 16 and the transmitter mechanism contained in the upper portion of the anchor weight 17.

At the same time when lead 27 is energized by the dropping of contact bar 24 energy is connected through the lead 35 to cause operation of the transmitter 47 which sends out a signal through the antenna 36. Further, the lead 27 is connected to the lead 37 which in turn energizes a blinking light 38 contained in the plastic transparent hemispherical portion 39 formed on the bottom portion of the transmitter tube 40.

The upper portion of the transmitter tube is connected to the balloon 16 at a suitable point 41 so that as the armature 22 of the relay coil 21 drops, when the coil 21 is de-energized as recited, the helium control valve 23 is opened to discharge helium out through the pipe 42 to inflate the balloon 16 whereupon the balloon 16 carries the tube 40 and the associated radio transmitter and blinker light apparatus upwardly into the sky.

A reel 43 is carried in the bore 44 of the anchor weight 17 and allows a cable 45 attached suitably at 46 to the hemispherical portion 39 of the tube 40 to pay out therefrom as the anchor weight 17 drops to the ground as best shown in Fig. 2. As a result, the radio transmitter and blinker light unit in tube 40 is thus suspended by the balloon at a substantial height but held at the location where it was ejected by the anchor weight 17 dropping to the ground and holding it in that location. As a result both a radio signal and a visual indication is emanated from the unit as shown in Fig. 2 after the crash has occurred. Preferably a suitable helium container 46 may be provided and connected to the helium discharge valve 23 for inflating the balloon 16 at the proper moment as the unit is ejected from the plane. Thus, there is provided an automatic means free of the occupants of the plane for discharging itself and setting up a warning device of both radio and visual character should any mechanical damage occur to the plane during flight or at the time of crash of a significant serious nature that would require immediate rescue work with a minimum of time lost in delay.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an air crash signal device for an aircraft structure including a balloon, a radio transmitter and a signal light suspended from said balloon, an anchor weight, a reel on said anchor weight having a cord interconnected between said anchor weight and said radio transmitter and signal light, a discharge tube fixed to the aircraft structure arranged to dischargeably carry said balloon, radio transmitter, signal light and anchor weight, a pressure chamber between said anchor weight and said discharge tube actuable to eject said weight, signal light and radio transmitter and said balloon, a control valve including an ejection relay energizable to actuate said pressure chamber, a helium chamber mounted with said radio transmitter and said light, a helium control valve on said helium chamber actuable to discharge helium from said helium chamber into said balloon to inflate the same, a power supply pack mounted with said radio transmitter and said signal light, a normally closed relay mounted with said radio transmitter and warning light arranged when de-energized to connect said power supply pack to said radio transmitter, said signal light, and said ejection relay and to open said helium control valve, and means on said aircraft structure adapted to de-energize said normally closed relay when said aircraft is subjected to crash damage.

2. In an air crash signal device for an aircraft structure as set forth in claim 1 wherein said means to de-energize said normally closed relay comprises electroconductive crash tapes distributed throughout the aircraft at vulnerable points thereon, and a power supply on said aircraft connected through said tapes to maintain said normally closed relay energized to open position during normal operation of said aircraft.

3. An air crash signal device for an aircraft structure comprising, an open end discharge tube fixed to the aircraft structure, a bottom in said tube, an anchor weight slidably mounted in said tube, pressure chamber means in the bottom of said weight effective in conjunction with the bottom of said tube to eject said weight therefrom, a first cavity having a divergent open end in the upper portion of said weight, a transmitter tube slidably mounted in said cavity, a reel contained in a second cavity in said weight below said first mentioned cavity having a cord interconnected between said weight and said transmitter tube, a balloon contained in the divergent end of said first mentioned cavity and the upper portion of said discharge tube, said balloon being connected to the upper end of said transmitter tube, a power supply pack, a radio transmitter, and a signal light carried in said transmitter tube, a helium supply container carried on said transmitter tube having means operable to discharge helium to inflate said balloon, and means on said aircraft actuable during crash damage thereto to cause said power supply pack to energize said pressure chamber to eject said weight, said radio transmitter and signal light, and said helium supply container to inflate said balloon.

References Cited in the file of this patent
UNITED STATES PATENTS

| | | |
|---|---|---|
| 2,149,808 | Ellis | Mar. 7, 1939 |
| 2,192,450 | Miller | Mar. 5, 1940 |
| 2,592,461 | Perkins et al. | Apr. 8, 1952 |
| 2,628,307 | Lloyd et al. | Feb. 10, 1953 |

FOREIGN PATENTS

| | | |
|---|---|---|
| 692,015 | Great Britain | May 27, 1953 |